Nov. 15, 1938.                R. N. FALGE                 2,137,079
                                 LENS
                        Filed Nov. 22, 1935      2 Sheets-Sheet 1
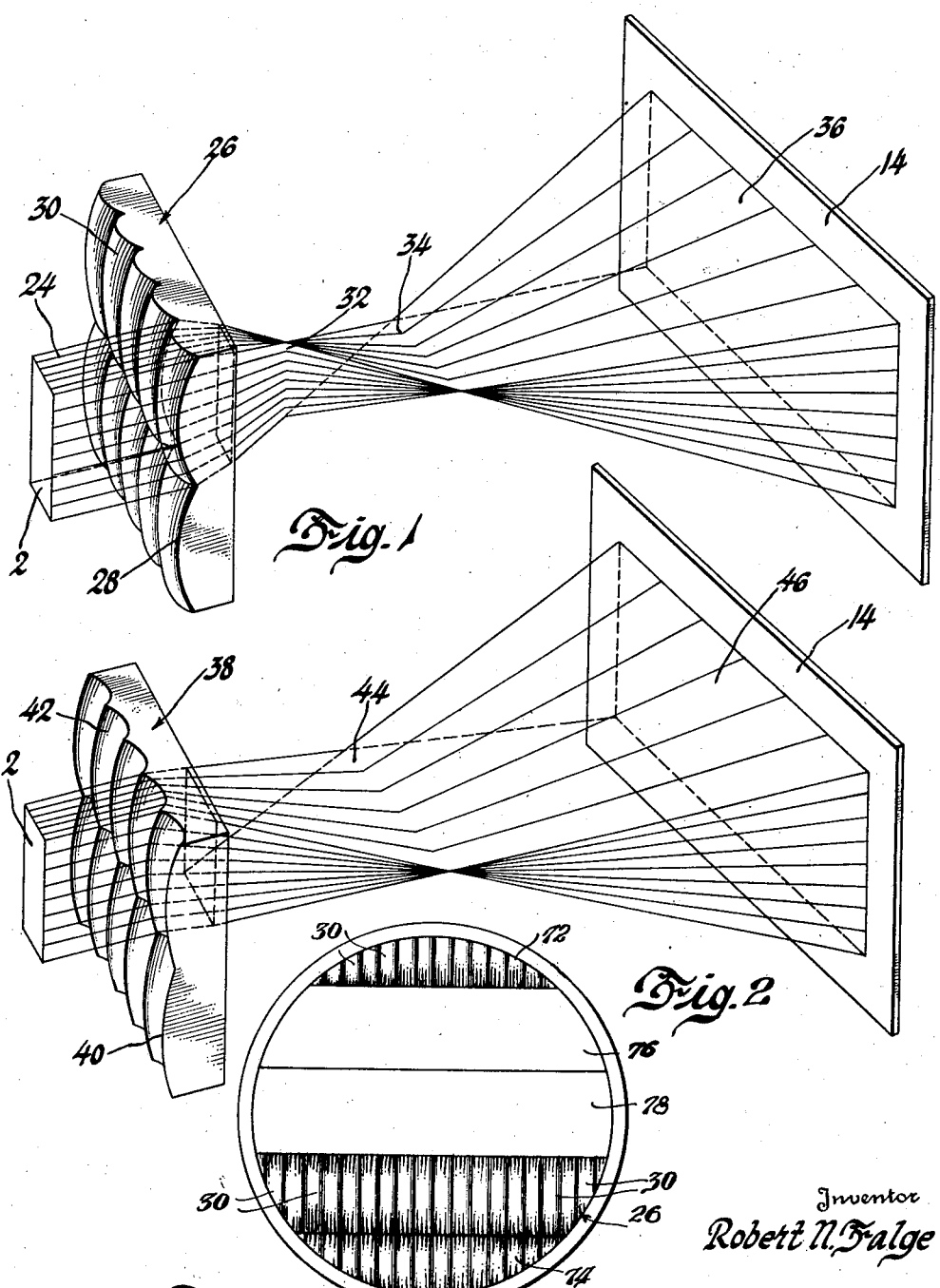

Patented Nov. 15, 1938

2,137,079

UNITED STATES PATENT OFFICE 2,137,079

LENS

Robert N. Falge, Anderson, Ind., assignor to General Motors Corporation, Detroit, Mich., a corporation of Delaware Application November 22, 1935, Serial No. 51,007

3 Claims. (Cl. 240—41.4)

This invention relates generally to light directing and modifying means and more specifically to lens structure to be utilized in headlamps for automotive vehicles.

It is primarily the object of any automobile headlamp and lens to illuminate the roadway ahead of the car with a satisfactory light pattern which will allow the car operator to see the roadway well and not cause a glare such as to confuse the driver of an approaching car. In order to properly illuminate the road it is necessary to have a bright or "hot spot" section of light that is concentrated on the road directly ahead of the vehicle, the distance ahead being dependent on the speed of travel, to accommodate, which a majority of cars are now provided with, a high beam for fast country driving and a low beam for city driving. It is then also necessary to have an area of less intensity adjacent the hot spot to illuminate the road between the hot spot and the car and also for a certain distance to each side so that the operator may see the edges of the road, parked cars and other obstructions.

In order to provide these various areas of differing degrees of light intensity, lenses have been designed with different sections directing their light to given parts of the composite pattern. Certain zones of the lens, generally those zones nearest the horizontal axis of the lens, provide overlapping beams which supply the illumination for the hot spot. The upper and lower lens zones on the other hand generally provide light for the side areas. These latter zones have means thereon for spreading the light both vertically and horizontally to disperse the same.

In order to spread the light emanating from the source within the headlamp, it has been customary to use a series of vertical flutes on one lens face and a series of horizontal flutes on the other face. This, of course, necessitated that the outer face of the lens be rough, the appearance of which was not as satisfactory as a smooth surface and also it would catch more dirt.

The particular advantage of the present invention is in applying diffracting means to the inner face of the lens to spread the rays from the source both vertically and horizontally leaving the outer face of the lens smooth to give a better appearance and to keep the same free from dirt.

It is the principal object of my invention to provide means on the upper and lower remote zones for dispersing and spreading the light.

It is a further object to provide spreading means that may be easily placed upon one lens face.

It is a still further object to provide dispersing means on one face of the lens for spreading the light in two directions at right angles to each other.

For a better understanding of the nature and objects of this invention, reference is made to the following specification wherein there are described the embodiments of my invention which are illustrated in the accompanying drawings, in which:

Figure 1 is a diagrammatic perspective view of the beam path and pattern through a lens having a combination of vertical and horizontal convex semi-cylindrical flutes on one side of the lens.

Figure 2 is a similar view through a lens having a combination of horizontal convex and vertical concave semi-cylindrical flutes on one lens face.

Figure 3 is a full face view of a headlamp lens including the zones built in conformity with my invention.

Figure 4:
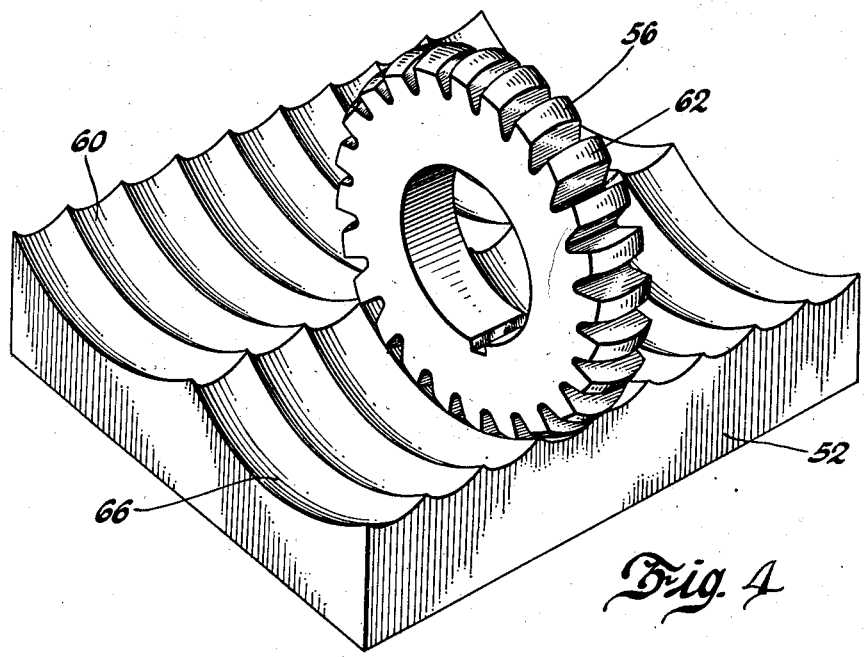
Figures 4 and 5 are views showing different forms of cutters in positions adjacent the mold face.

As previously mentioned, it is necessary to spread the beam from the light source both horizontally and vertically and it is for this purpose that the form of invention shown in Figure 1 is designed. The beam from the light source 2 in this instance is formed of a plurality of parallel rays 24 which are incident upon the rear face of a lens 26. The rear face of the lens portion 26 is formed of a plurality of horizontal parallel convex parti-cylindrical flutes 28 of comparatively large size. Formed upon the faces of the flutes 28 and at right angles to the axes thereof, are a second series of vertical flutes 30 which are convex and parallel but whose longitudinal axes are curved to conform to the curvature of the horizontal flutes. Thus it is evident that we have a plurality of surfaces on the lens that are spherical in that they are curved in two directions. If the radii of the horizontal and vertical flutes were equal the surfaces would be those of a sphere. However, the horizontal flutes 28 have a larger radius and less curvature since it is desirable to have less spread in this direction.

The paths of the rays are clear from the drawings, the lens 26 first bending the rays toward each other horizontally to a greater extent since the curvature is greater in this plane which forms a focal line 32. It should be noted however that this is shorter than the length of the section of the lens since the horizontal curvature is also affecting the rays. The rays then diverge horizontally from the focal line 32 which is vertical and converge in a vertical plane to form a horizontal focal line 34 from which line they form a pattern 36 on the screen 14.

Figure 2 shows a complex lens portion 38 which has a plurality of comparatively large convex flutes 40 on the rear face and upon the surface of these a plurality of parallel concave vertical flutes 42 whose axes are curved to conform to the curvature of the surface of the horizontal flutes in a manner similar to that shown in Figure 1. The rays of light from the source 2 are spread horizontally by the concave vertical flutes 42 but are converged by the convex horizontal flutes to form a focal line 44 which it should be noted is considerably wider than the flutes that form it due to the horizontal divergence. As in the former cases the beam pattern 46 is shown on the screen 14.

Figure 3 is a full face view of an automobile headlight lens 70 having thereon a plurality of different zones such as 72, 74, 76 and 78 for directing the light rays penetrating through those particular zones to a certain desired portion of the resultant beam pattern on the road. It will be noted that the upper and lower sections 72 and 74 are constructed in conformity with the invention as heretofore described, namely being formed of surfaces curved in a plurality of directions to spread the light in both the vertical and horizontal planes. The purpose of this particular figure is merely to show the final or composite construction of the lens using my invention.

Figure 5:
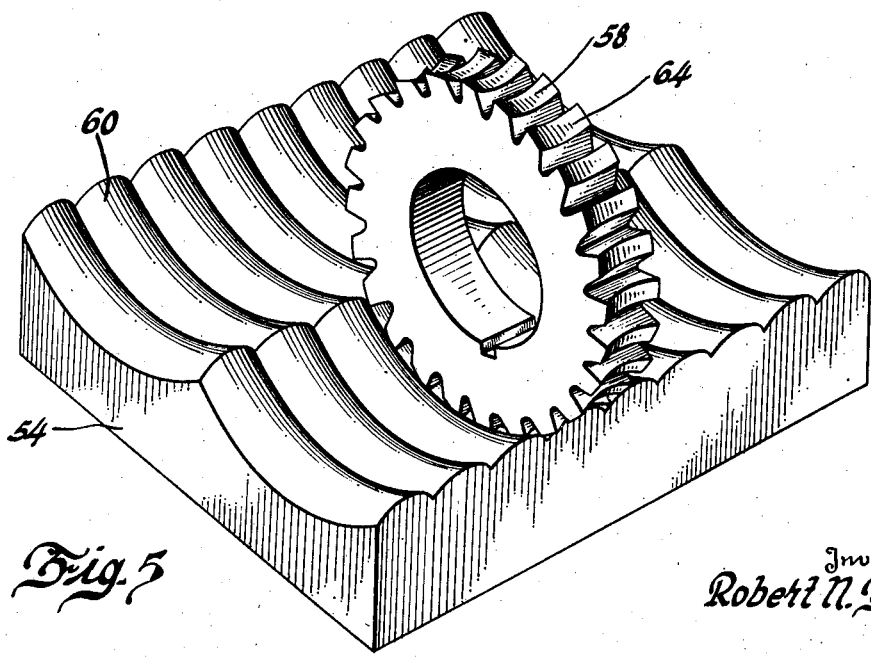

Figures 4 and 5 are views showing the cutting of molds for the various lens forms shown and show the two molds 52 and 54 which will produce lenses such as those shown in Figures 1 and 2 respectively. In cutting these molds the cutters 56 and 58 have convex and concave faces respectively. The outer circumferential curvature is designed to give the correct curve to the horizontal flutes such as at 60 and the faces of the milling teeth are convex or concave as at 62 or 64 to give the desired curvature to the smaller vertical flutes. It is very simple to cut these molds as it is only necessary to support the cutter above the mold and advance it a certain required distance toward the mold to cut one groove such as 66, then retract the cutter and move the same the width of the cutter to one side and again advance to the same depth to cut the second flute and thus proceed until the whole surface has been fluted along one horizontal line. It is then only necessary to advance the milling cutter at right angles the distance between the two lines of two of the horizontal flutes and carry out the same procedure. Of course it would make no difference as to whether the surface of the milling teeth were convex or concave as this merely changes the outline of the small vertical flutes, as shown in Figures 4 and 5. After the molds have been prepared, it is of course necessary to cast the glass lens upon the same which will form the lenses shown in Figures 1 and 2.

It will thus be evident that I have provided a lens structure which is easily manufactured and which utilizes surfaces having curvature in two directions on one face of the lens to spread or disperse the light rays therefrom in two different directions and at the same time leave the outer or visible surface of the lens plain.

I claim:

1. A lens for an automobile headlamp comprising, one plain surface, a plurality of similar adjacent horizontal parti-cylindrical parallel flutes on the opposite face, a second series of smaller vertical similar adjacent parallel flutes superimposed on the first set and having their axes at right angles to the axes of the first set and having smaller radii and larger curvature than the flutes of the first set whereby the resultant surface of the distorted lens face has a curvature in two directions at right angles to each other and the impinging light which passes through the lens will be spread or dispersed only in two directions at right angles to each other, each set having a comparatively short symmetric arcuate length whereby the irregular surface will be comparatively flat and there will be no sharp projections.

2. A lens for an automobile headlamp comprising, one plain surface, a plurality of similar adjacent horizontal parti-cylindrical parallel flutes on the opposite face, a second series of smaller vertical similar adjacent parallel flutes superimposed on the first set and having their axes at right angles to the axes of the first set and having smaller radii and larger curvature than the flutes of the first set whereby the resultant surface of the distorted lens face has a curvature in two directions at right angles to each other and the impinging light which passes through the lens will be spread or dispersed only in two directions at right angles to each other, each set having a comparatively short symmetric arcuate length whereby the irregular surface will be comparatively flat and there will be no sharp projections; both sets of flutes being convex.

3. A lens for an automobile headlamp comprising, one plain surface, a plurality of similar adjacent horizontal parti-cylindrical parallel flutes on the opposite face, a second series of smaller vertical similar adjacent parallel flutes superimposed on the first set and having their axes at right angles to the axes of the first set and having smaller radii and larger curvature than the flutes of the first set whereby the resultant surface of the distorted lens face has a curvature in two direction at right angles to each other and the impinging light which passes through the lens will be spread or dispersed only in two directions at right angles to each other, each set having a comparatively short symmetric arcuate length whereby the irregular surface will be comparatively flat and there will be no sharp projections, the horizontal flutes being convex and the vertical flutes concave.

ROBERT N. FALGE.